United States Patent
Birk

(10) Patent No.: US 6,679,195 B1
(45) Date of Patent: Jan. 20, 2004

(54) METHOD AND AN APPARATUS FOR MILKING LOOSE GOING DAIRY ANIMALS

(75) Inventor: Uzi Birk, Huddinge (SE)

(73) Assignee: DeLaval AB, Tumba (SE)

( * ) Notice: Subject to any disclaimer, the term of this patent is extended or adjusted under 35 U.S.C. 154(b) by 0 days.

(21) Appl. No.: 09/786,414

(22) PCT Filed: Sep. 3, 1999

(86) PCT No.: PCT/SE99/01532
§ 371 (c)(1),
(2), (4) Date: May 8, 2001

(87) PCT Pub. No.: WO00/13493
PCT Pub. Date: Mar. 16, 2000

(30) Foreign Application Priority Data

Sep. 3, 1998 (SE) .............................................. 9802977

(51) Int. Cl.$^7$ ............................... A01J 3/00; A01J 5/00; A01K 1/00; A01K 1/12
(52) U.S. Cl. ................................ 119/14.03; 119/14.02; 119/516; 119/520; 119/523; 119/524
(58) Field of Search .......................... 119/14.03, 14.08, 119/438, 516, 520, 523, 522, 524, 502, 14.04, 840

(56) References Cited

U.S. PATENT DOCUMENTS 2,638,870 A * 5/1953 MacDonald
3,545,407 A * 12/1970 Moore .......................... 119/20
4,508,058 A * 4/1985 Jakobson et al. ......... 119/14.02
4,535,723 A * 8/1985 Gealy ........................... 119/20
5,000,119 A    3/1991 Moreau et al.
5,771,837 A * 6/1998 Van der Lely ........... 119/14.02
6,019,061 A * 2/2000 Schulte ..................... 119/14.03
6,237,530 B1 * 5/2001 Van der Lely et al. ... 119/14.08
6,357,395 B1 * 3/2002 Nilson ......................... 119/524

FOREIGN PATENT DOCUMENTS

| EP | 0 566 201 | 10/1993 |
| EP | 0 567 191 | 10/1993 |
| EP | 0635204 A1 * | 1/1995 ............. A01J/7/00 |
| EP | 0 764 403 | 3/1997 |

* cited by examiner

Primary Examiner—Peter M Poon
Assistant Examiner—Andrea M. Valenti
(74) Attorney, Agent, or Firm—Young & Thompson

(57) ABSTRACT

A method for serving animals, such as milking dairy animals, allowed to go loose in an enclosed area, with animal stalls with a robot. The stalls have entrance and exit gates that are controlled. A service area includes at least three stationary animals stalls around a robot to form a central robot inner area. The robot is associated with the controller for the gates and is capable of moving to and serving each one of the animal stalls. A strolling area is arranged between the outer border of the enclosed area and the central robot area with animal stalls that is divided into subareas in various ways by the use of separators that may include controlled one-way passing gates for the animals.

16 Claims, 5 Drawing Sheets

METHOD AND AN APPARATUS FOR MILKING LOOSE GOING DAIRY ANIMALS

TECHNICAL FIELD OF THE INVENTION

The present invention refers to a method in serving animals, such as milking cows and other dairy animals, allowed to go loose in an outdoor or indoor enclosed area, with at least one animal stall arranged for serving the animals, preferably in an automatic way by the use of a robot, the animals having identification means associated with a control means to deliver individual data for the animal to be automatically identified, said animal stalls having an entrance gate and an exit gate associated with said control means, said gates being opened and/or closed in response to signals from said control means.

The invention also refers to an apparatus for serving animals, such as for milking cows and other dairy animals, allowed to go loose in an outdoor or indoor enclosed area, with at least one animal stall arranged for serving the animals, preferably in an automatic way by the use of a robot, the animals having identification means associated with a control means to deliver individual data for the animal to be automatically identified, said animal stalls having an entrance gate and an exit gate associated with said control means, said gates being opened and/or closed in response to signals from said control means.

BACKGROUND OF THE INVENTION

Such a method and such an apparatus are known from EP-A-0 091 892. This apparatus has milking boxes or milking stalls, which comprise devices needed for proper milking such as for teat washing and cleaning, udder massaging means, premilking means, milking apparatus, milk testing apparatus and other devices known per se.

In using such a method and such an apparatus it is of great economic value that an efficient use is made of the devices and the capital involved. The time wasted should be a minimum. To achieve this the animals must be managed in such a way that they do not move at random in an unstructured way, e.g. such that an animal that should not be served is blocking the way of an animal that should be served or that the time spent for entering and leaving the animal stalls represent a too great share of the total service cycle time.

Figure 2:
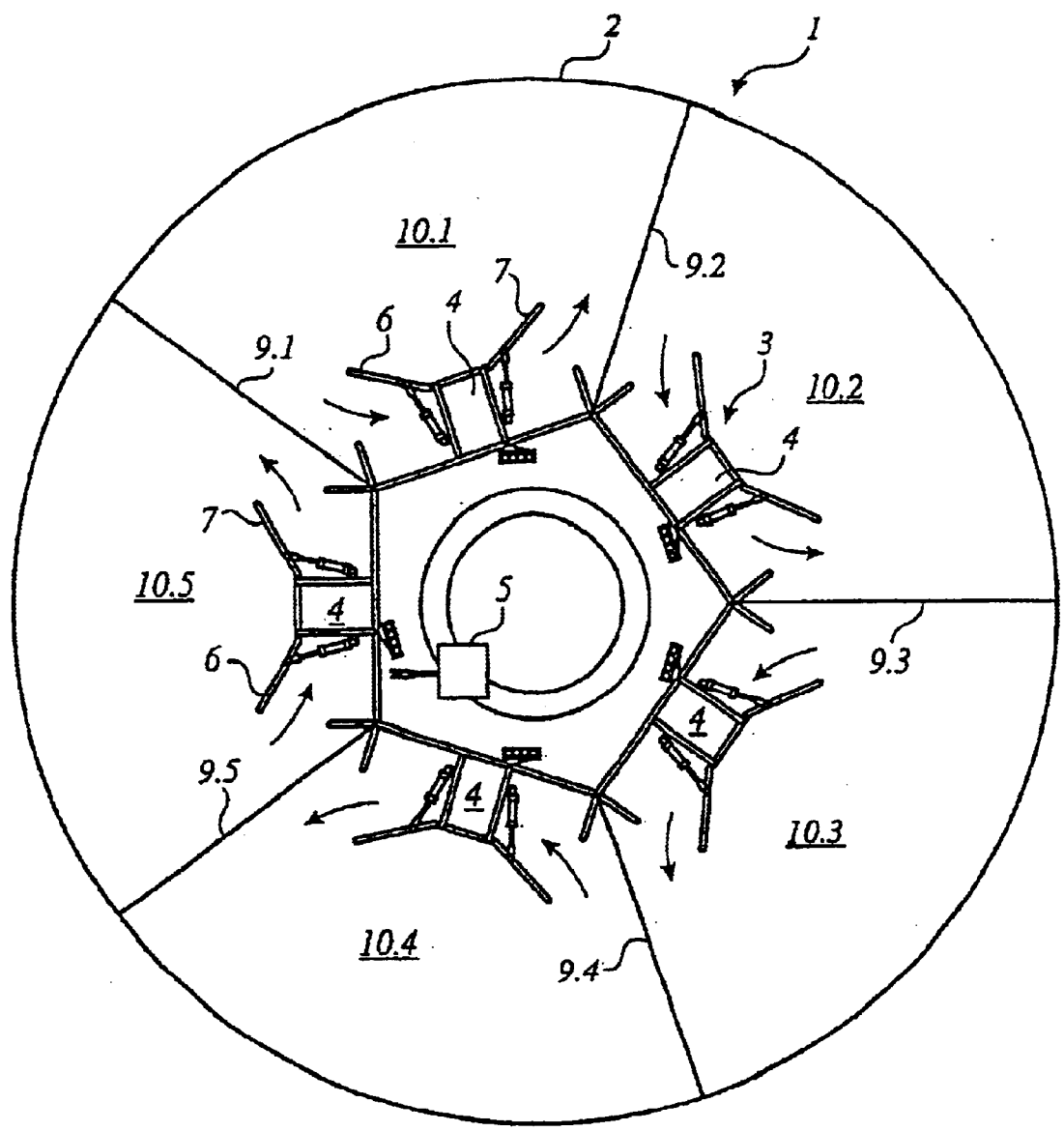

Referring to EP-A-0 091 892, FIG. 2 teaches a type of animal stall having a carrousel or rotating platform driven by machinery and comprising tangentially arranged animal stalls as milking stalls around its periphery. The animals are kept on the rotating platform during the complete milking session. Adjacent to the platform there is arranged milking equipment and other devices.

In this apparatus the rotating speed of the platform has to be adapted such that the milking time must not be less than the maximum milking time needed to ensure a complete milking session for any one of the animals. The maximum milking time thus is the minimum time for one revolution of the platform. This in turn means that for all animals needing a shorter milking time there is a loss of time corresponding to the difference between the maximum milking time and the individually needed milking time. Also in this type of milking stall there will be a waste of time as to the efficient time of utilizing the costly milking devices.

Figure 4:
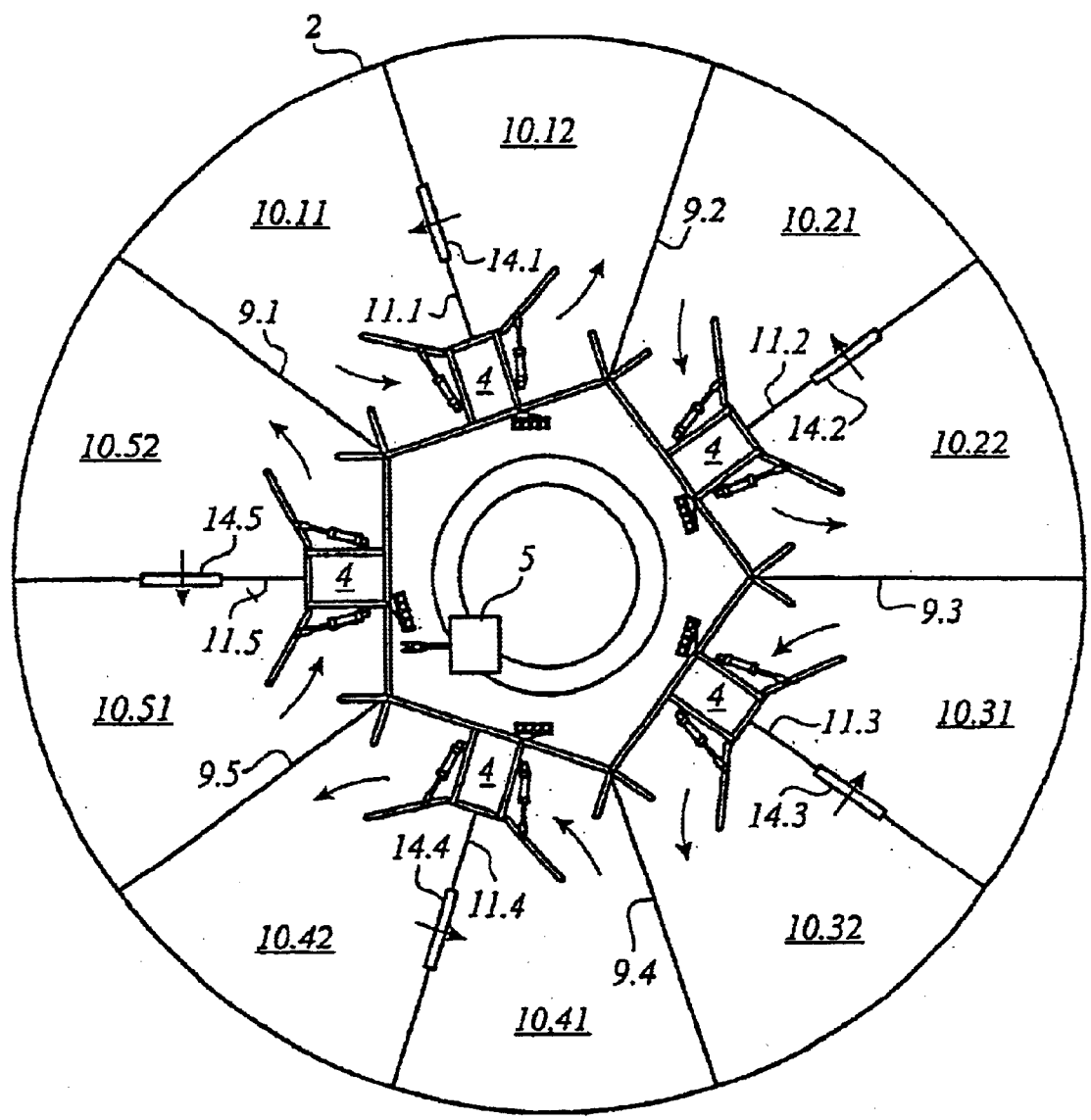

Referring again to EP-A-0 091 892, FIG. 4 shows a stationary apparatus having 12 milking stalls arranged in a circle and a robot movable between the stalls. This apparatus allows that each animal, according to transponder identification and computer control in a way known per se, can be given an accurate service time applicable to the individual conditions according to calculated data to give the optimal service result. However, in this case the animal has to enter the animal stall to its full length to reach the transponder sensing means 3, situated at the very innermost end of the stall. In this case the animal, after having entered the animal stall to its very end, has to be made to go backwards out of the stall. This certainly means wasted service time and thus lost service capacity.

However, there also are animals which might be served but for which the time spent after the previous service session might be considered too short such that the animal preferably should wait and be served at a later time. Even if the animal is in fact served the set up time for the service apparatus takes too great a share of the total service time cycle for the serviced performance. This means that—although a service session is in fact performed—this is not made with optimal efficiency. The cited patent document thus teaches methods and apparatuses displaying time consuming and non-economic service.

OBJECT OF THE INVENTION

The object of the present invention is to improve the known method and apparatus in such a way as to achieve a more structural movement of the animals by increasing the probability that an animal wanting to enter an animal stall really is to be milked or served in another way and that the wasted time of the service cycle is minimized. In this way a more economic and efficient use is made of the capital invested in the permanent assets.

SUMMARY OF THE INVENTION

This object has been achieved by a method of the initially defined kind which is characterised by the steps of arranging the service area such as to comprise at least three stationary animal stalls, placing the animal stalls around the robot such as to form a central, preferably circular or polygonal robot inner area, arranging a displaceable service and/or milking robot in said inner area, said robot being associated with said control means and being capable of moving to and serving each one of the animal stalls.

The object has also been achieved by an apparatus of the initially defined kind characterised by a service area with at least three stationary animal stalls, said animal stalls being placed around the robot so as to form a central, preferably circular or polygonal robot inner area, a displaceable service and/or milking robot in said inner area, said robot being associated with said control means and being capable of moving to and serving each one of the animal stalls. Hereby is achieved a very efficient and economic unit for servicing animals.

Preferably there is arranged a strolling area, where the animals can go loose, said strolling area extending between the outer border of the enclosed area and inwards to the animal stalls outside the robot area, said strolling area communicating with the animal stalls. Hereby is achieved a good communication between the stalls and the strolling area.

Suitably the method includes the step of arranging partitions such that each animal stall communicates with its own defined strolling area Hereby is achieved that the animals may be arranged in suitable groups.

Preferably the method includes the step of arranging the partitions in a radial direction from the central robot area thus forming sector areas. Hereby a very concentrated arrangement is achieved.

Suitably the method includes the step of dividing by a separation, such as a fence, the strolling area into at least two subareas, an entrance area, arranged for keeping animals that are to enter the animal stall to be served, e.g. milked and an exit area, arranged for animals which have been served and have left the animal stall. Hereby a more controlled movement of the animals is achieved.

Preferably the method includes arranging an entrance gate to the animal stall connecting the entrance area to the animal stall and arranging an exit gate at the animal stall connecting said animal stall to the exit area. Hereby a still more controlled movement of the animals is achieved.

Suitably the method includes opening the entrance gate of the animal stall for an animal only in case the algorithm of the control means indicates that the animal wanting to enter the animal stall is allowed to be milked or served in some other way. Hereby is achieved that animals that are not in need of service do not unduly occupy the animal stalls.

Suitably the method includes arranging a one-way gate in said separation, allowing animals to pass from the exit area to the entrance area but not vice versa. Hereby animals having been served cannot mingle with animals in greater need of service. Alternatively the method includes arranging a one-way gate leading from the exit area of one section to the entrance area of an adjacent animal stall. Hereby is achieved that animals may be transferred from one group of animals to another one. Preferably the method includes sensing the time passed since the previous service or milking session and allowing the animal to pass through the one-way gate only if a predetermined part of the service or milking cycle has passed. Hereby is achieved that an animal in greater need of service can be given priority over animals with less need.

Suitably the method includes defining the outer boundary of the enclosed area in the form of a circle or a polygon. This will give a very concentrated construction making it easy to handle the animals.

Suitably said animal stalls are placed in a regular form around the robot. This will make a base for using identical equipment for all the stalls, thus making them less costly.

Preferably the apparatus includes a strolling area, where the animals go loose, said strolling area extending between the outer border of the enclosed area and inwards to the animal stalls outside the robot area, said strolling area communicating with the animal stalls.

Suitably the apparatus includes partitions such that each animal stall communicates with its own defined strolling area.

Preferably said partitions extend in a radial direction from the central robot area thus forming sector areas.

Alternatively the apparatus comprises a separation, such as a fence, dividing the strolling area into at least two subareas, an entrance area arranged for keeping animals that are to enter the animal stall to be served, e.g. milked, and an exit area, arranged for animals having been served and left the animal stall.

Alternatively the apparatus comprises an entrance gate to the animal stall connecting the entrance area to the animal stall and an exit gate at the animal stall connecting said animal stall to the exit area.

Suitably the apparatus comprises a means opening the entrance gate of the animal stall for an animal only in case the algorithm of the control means indicates that the animal wanting to enter the animal stall is allowed to be milked or served in some other way.

Preferably the apparatus comprises a one-way gate in said partition, allowing animals to pass from the exit area to the entrance area but not vice versa.

Alternatively the apparatus comprises a one-way gate leading from an exit area of one section to the entrance area of an adjacent animal stall.

Suitably the apparatus comprises a means sensing the time passed since the previous service or milking session and allowing the animal to pass through the one-way gate only if a predetermined part of the service or milking cycle has passed.

Suitably the apparatus is such that the outer boundary enclosing all the animal stalls and strolling areas is formed mainly as a circle or a polygon.

DRAWING SUMMARY

Figure 1:
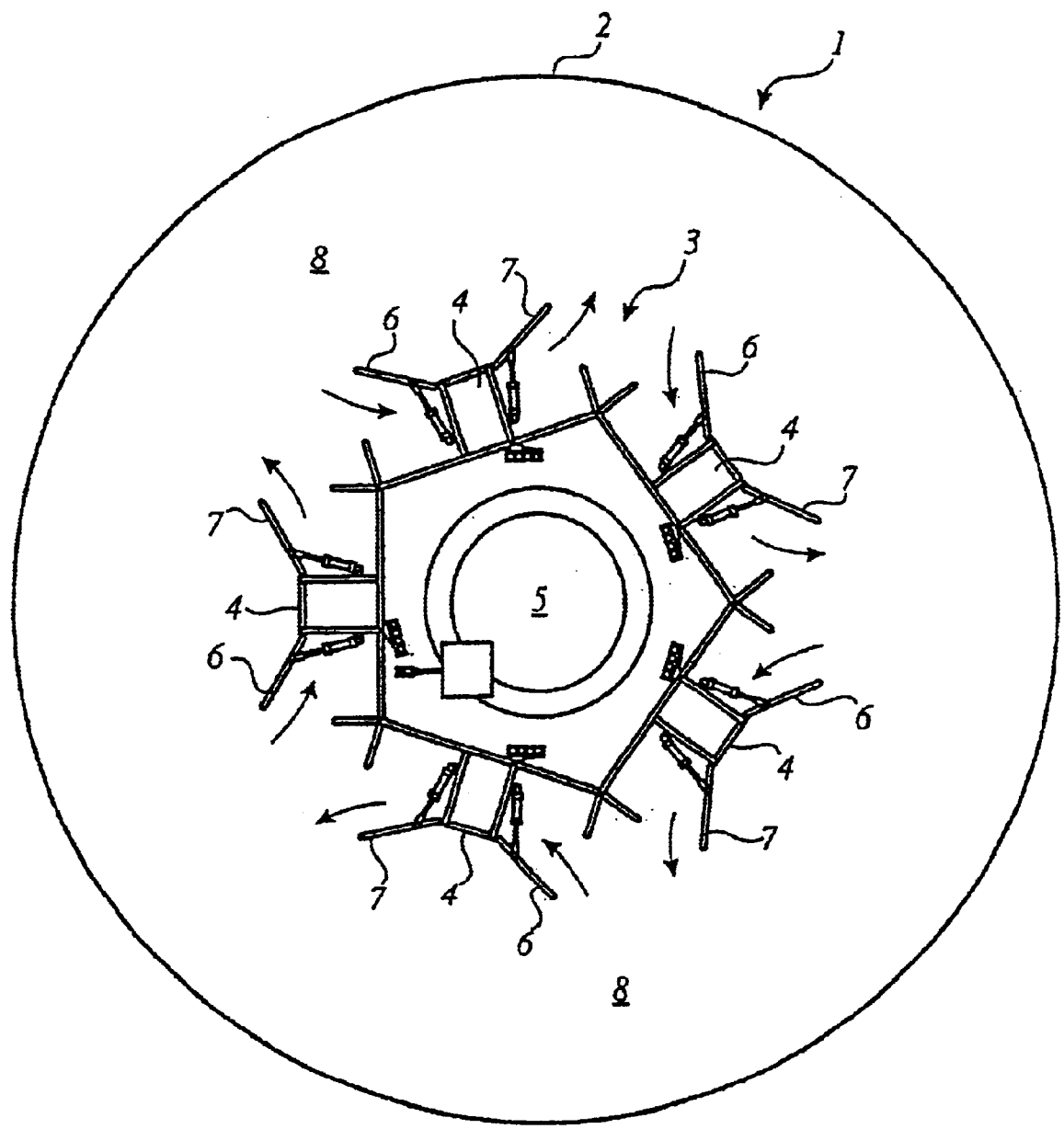
Figure 3:
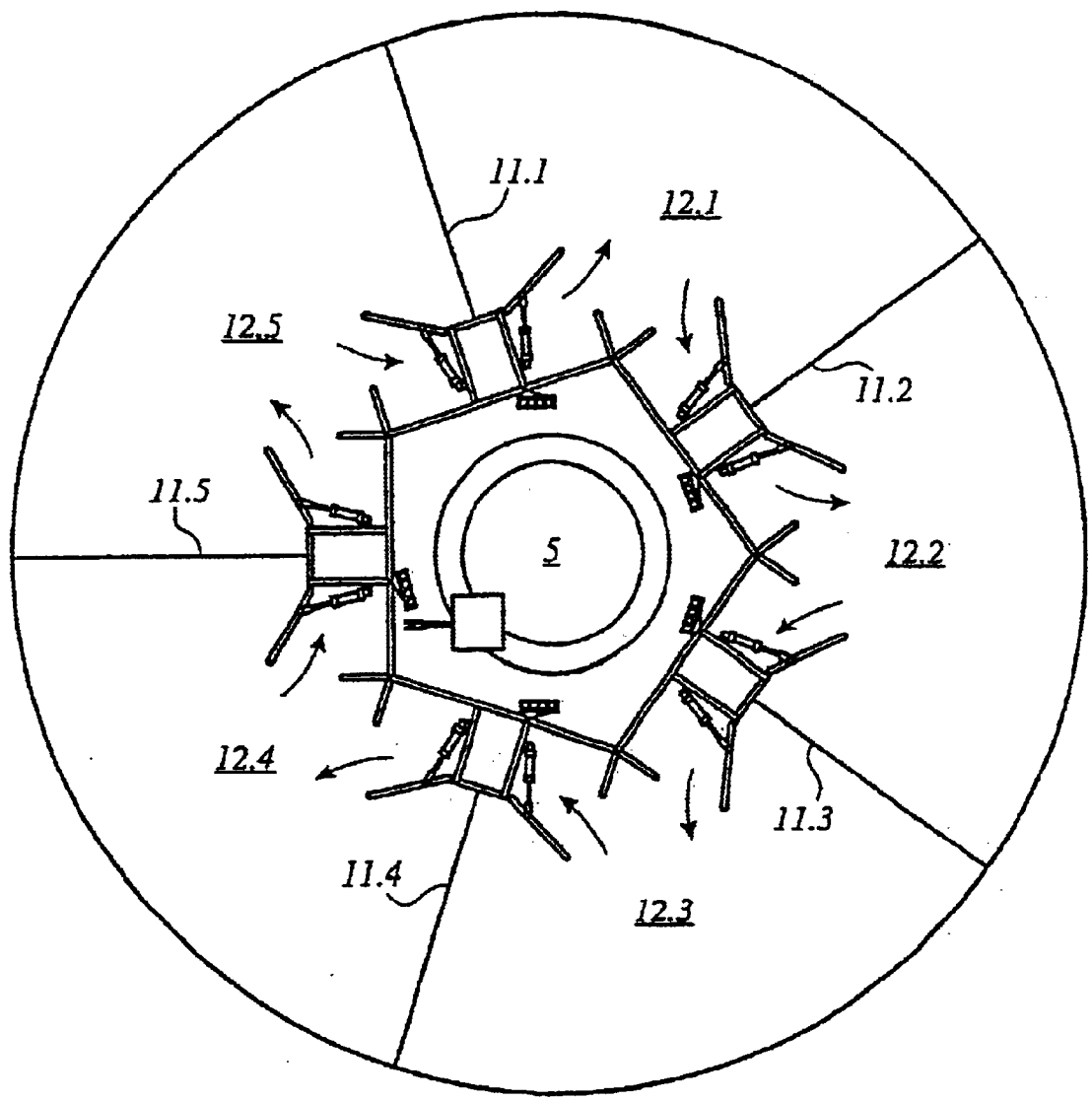
Figure 5:
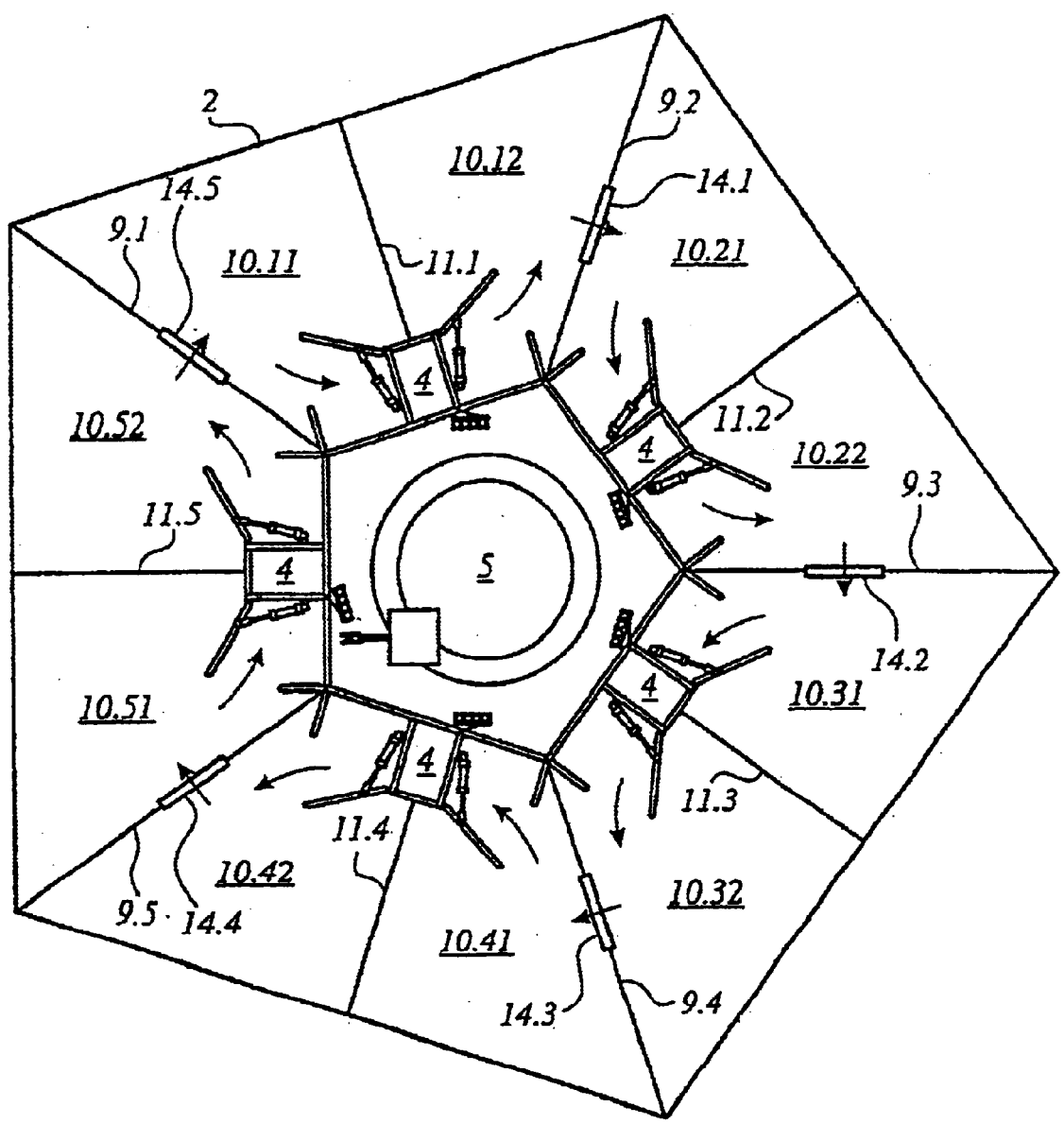

For a better understanding of the invention exemplifying embodiments will now be described with reference being made to schematic representations to be found in the accompanying drawings in which FIG. 1 shows a prior art arrangement of animal stalls formed as a unit in the center of an enclosed area having a circular outer boundary, FIG. 2 shows an enclosed area having a circular outer boundary and five sections defined by partitions such that each section comprises the entrance gate and the exit gate of one and the same animal stall, FIG. 3 shows a similar enclosed area having five sections defined by partitions such that each section comprises the exit gate of one animal stall and the entrance gate of the adjacent animal stall, FIG. 4 shows an enclosed area with five sections corresponding the ones in FIG. 1, however, the sections in FIG. 1 have each one been divided into two subareas by separations, one area being an entrance area and one area being an exit area, said separations also having a one-way passage gate, and FIG. 5 shows an enclosed area of polygonal form, also having five sections, the main arrangement corresponding to the one of FIG. 3, however, the partitions themselves have one-way gates allowing passage from the exit area of one section to the entrance area of an adjacent section.

DETAILED DESCRIPTION

In FIG. 1 the restricted area denoted by 1 and 2 is the outer boundary of this area, e.g. a fence or a wall. In the middle of the restricted area there is arranged an animal stall unit 3 comprising five animal stalls 4 arranged in a regular polygonal form as a pentagon. In the centre of the animal stall unit there is arranged a robot 5 capable of serving each one of the animal stalls 4. Each animal stall 4 has an entrance gate 6 and an exit gate 7 controlled by a control means for opening and closing. Arrows indicate entrance and exit directions for the animals.

The area between the outer boundary 2 and the animal stall unit 3 is the strolling area 8 where the animals are allowed to go loose.

A similar arrangement is disclosed in U.S. Pat. No. 4,508,058 that corresponds to the aforementioned EP-A-0 091 892.

In FIG. 2 the restricted area 1, the outer boundary 2 and the strolling area 8 are the same as in FIG. 1. However, the strolling area is divided by five partitions 9.1–9.5 into five strolling areas in the form of sectors 10.1–10.5. The partitions are arranged such that they abut the animal stalls just outside the entrance and exit gates of one specific animal stall meaning that each animal stall communicates with only one defined strolling area. The movements of the animals are indicated by arrows which clarifies this situation. In this way different groups of animals may be delimited from other animal groups.

In FIG. 3 there also are five partitions 11.1–11.5 delimiting strolling areas 12.1–12.5. In this case the partitions 11.1–11.5 are arranged such that they abut the animal stalls between the entrance gate 6 and the exit gate 7 of each stall 4. Also here the direction of the movements of the animals are indicated by arrows. It is obvious that by this arrangement an animal may pass from the strolling area 12.1 through the entrance gate of the animal stall 4 and by leaving the animal stall through the exit gate 7 it arrives in the neighbouring strolling area 12.2. By this arrangement the animals may be strolling without having to belong to a group decided by the farmer. There also is the possibility to arrange different kinds of service for the animals at the different animal stalls.

The arrangement in FIG. 4 corresponds to the one shown in FIG. 2. Additionally there are arranged separation means 11.1–11.5 in between the partitions 9.1–9.5, said separation means abutting the animal stalls between the entrance gate 6 and the exit gate 7 of each specific animal stall. Also here the movements of the animals are indicated by arrows. By this arrangement the strolling areas 10.1–10.5 are divided into two subareas 10.11–10.51 and 10.12–10.52 respectively, said first subareas 10.11–10.51 being entrance areas to the entrance gate of an animal stall and said second subareas 10.12–10.52 being exit areas from the same animal stall. The animals thus may pass from an entrance area, e.g. 10.11, through the entrance gate 6 of an animal stall 4 and through the exit gate 7 of the same stall to the exit area, e.g. 10.12.

In the separation means, which may have the form of fences or walls, there are arranged one-way gates 14.1–14.5 which allow passage of the animals in one way only, as shown from the exit area to the entrance area, e.g. from 10.12 to 10.11. It is optional to make said passage under control of the control means such that only animals having a specific characteristic are allowed to pass. In the same way as in FIG. 2 different groups of animals may be delimited from other groups.

FIG. 5 shows an arrangement similar to the one shown in FIG. 4 with the difference that said one-way gates are arranged in the partitions 9.1–9.5. As previously, arrows indicate the direction of the movements of the animals. As seen from FIG. 5 said arrangement of the one-way gates allow the animals to pass from an exit area of one strolling area to the entrance area of an adjacent strolling area. In contrast to the circular outer boundary of the enclosed area in FIG. 4 the outer boundary in FIG. 5 has the form of a polygon, a regular pentagon.

The invention may be applied to various kinds of animals, however, in particular it relates to lactating animals such as cows, sheep, goats, horses and buffaloes.

What is claimed is:

1. A method for serving animals allowed to go loose in an enclosed area, with at least three stationary animal stalls arranged for serving the animals by the use of a robot, identification and a controller being provided to identify individual animals, each of the animal stalls having an entrance gate and an exit gate associated with the controller, the gates being opened and/or closed in response to signals from the controller, the method including the steps of:

placing the at least three animal stalls around the robot so as to form a central robot inner area, the robot being associated with the controller and moving to and serving each one of the at least three animals stalls;

arranging a strolling area, where the animals can go loose, between an outer border of the enclosed area and the at least three animal stalls outside the robot inner area;

arranging partitions to define at least three different and separate sub-strolling areas, each of the sub-strolling areas defining a different area of restricted animal movement and communicating with a different one of the at least three animal stalls; and subdividing each of the sub-strolling areas by a separation so as to define, for each of the sub-strolling areas, an entrance area arranged for keeping animals that are to enter the respective one of the animal stalls and an exit area arranged for animals which have left the respective animal stall.

2. The method as claimed in claim 1, including the step of arranging the partitions in a radial direction from the central robot inner area thus forming sector areas.

3. The method as claimed in claim 1, including the step of connecting the entrance area to the respective entrance gate of the respective animal stall and connecting the exit gate of the respective animal stall to the respective exit area.

4. The method as claimed in claim 1, including the step of arranging a one-way gate in the separation, allowing animals to pass from the exit area to the entrance area but not vice versa.

5. The method as claimed in claim 4, including the step of sensing time passed since a previous service and allowing an animal to pass through the one-way gate only if a predetermined part of the service has passed.

6. The method as claimed in claim 1, including the step of arranging a one-way gate in the separation leading from the exit area of one of the sector areas to the entrance area of an adjacent one of the sector areas.

7. The method as claimed in claim 1, including the step of defining the outer boundary of the enclosed area in the form of a circle or a polygon.

8. The method as claimed in claim 1, including the step of opening the entrance gate of the respective animal stall for an animal only when the controller indicates that the animal wanting to enter the respective animal stall is allowed to be served.

9. An apparatus for serving animals allowed to go loose in an enclosed area, the apparatus comprising:

a robot in an inner area of the enclosed area for automatically serving the animals;

at least three animal stalls in which the animals are served by said robot, said at least three animal stalls being arranged around said inner area;

each of said at least three animal stalls having an entrance gate and an exit gate;

identification means for identifying individual animals;

control means associated with said identification means and said robot for controlling access to and service in said at least three animal stalls;

a strolling area where the animals are loose, said strolling area extending from an outer border of said enclosed area to said at least three animal stalls;

partitions in said strolling area that define at least three sub-strolling areas, each of said sub-strolling areas defining a different area of restricted animal movement and communicating with a different one of said at least three animal stalls; and separations that subdivide each of said sub-strolling areas so as to define, for each of said sub-strolling areas, an entrance area for keeping animals that are to enter a respective one of said animal stalls and an exit area for keeping animals that have been served in the respective one of said animal stalls.

10. The apparatus of claim 9, wherein said partitions extend radially from said inner area so that said at least three sub-strolling areas are sectors of a circle.

11. The apparatus of claim 9, wherein said entrance area communicates with a respective said entrance gate and said exit area communicates with a respective said exit gate.

12. The apparatus of claim 9, further comprising a one-way gate that permits animals to move from said exit area to said entrance area, but not vice versa.

13. The apparatus of claim 9, further comprising a one-way gate that permits animals to move from said exit area of one of said sub-strolling areas to said entrance area of an adjacent one of said sub-strolling areas.

14. The apparatus of claim 13, further a sensor that senses time since a previous service of an animal and that allows the animal to pass through said one-way gate only if a part of the service cycle has passed.

15. The apparatus of claim 9, wherein said outer boundary is one of a circle and a polygon.

16. The apparatus of claim 9, wherein said control means opens a respective said entrance gate only when said control means recognizes that the animal, as identified by said identification means, is to be served.

* * * * *